(12) United States Patent
Tsukahara

(10) Patent No.: US 7,889,404 B2
(45) Date of Patent: Feb. 15, 2011

(54) IMAGE READING DEVICE, IMAGE FORMING APPARATUS, AND READING-UNIT INSTALL METHOD

(75) Inventor: Hajime Tsukahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 468 days.

(21) Appl. No.: 12/113,509

(22) Filed: May 1, 2008

(65) Prior Publication Data

US 2008/0297862 A1    Dec. 4, 2008

(30) Foreign Application Priority Data

May 31, 2007   (JP)   ............................. 2007-145467
Mar. 26, 2008   (JP)   ............................. 2008-081661

(51) Int. Cl.
    *H04N 1/60*      (2006.01)

(52) U.S. Cl. ...................................... 358/518; 358/504

(58) Field of Classification Search .................. 358/1.9, 358/2.1, 504, 518, 474; 382/162, 167; 347/118
See application file for complete search history.

(56) References Cited

U.S. PATENT DOCUMENTS

| | | | |
|---|---|---|---|
| 6,078,684 A | | 6/2000 | Inoue |
| 6,480,625 B1 * | 11/2002 | Yamazaki | .................. 382/167 |
| 6,560,357 B1 * | 5/2003 | Yamazaki | .................. 382/167 |
| 6,587,224 B1 * | 7/2003 | Nabeshima et al. | .......... 358/1.9 |
| 7,414,750 B2 * | 8/2008 | Yoshida | ...................... 358/1.9 |
| 2002/0122209 A1 * | 9/2002 | Yoshida | ...................... 358/2.1 |
| 2005/0141049 A1 | 6/2005 | Baba | |
| 2007/0097466 A1 * | 5/2007 | Sakamoto | .................. 358/518 |
| 2007/0115339 A1 * | 5/2007 | Matsuzaki et al. | .......... 347/118 |
| 2007/0216915 A1 | 9/2007 | Tsukahara | |
| 2008/0024842 A1 | 1/2008 | Tsukahara et al. | |
| 2008/0068467 A1 | 3/2008 | Kanno et al. | |
| 2008/0212146 A1 | 9/2008 | Tsukahara et al. | |

FOREIGN PATENT DOCUMENTS

| | | |
|---|---|---|
| CN | 1188365 A | 7/1998 |
| CN | 1645893 A | 7/2005 |
| JP | 2000-59637 | 2/2000 |
| JP | 2000-216997 | 8/2000 |
| JP | 2004-104239 | 4/2004 |

\* cited by examiner

*Primary Examiner*—Kimberly A Williams
(74) *Attorney, Agent, or Firm*—Oblon, Spivak, McClelland, Maier & Neustadt, L.L.P.

(57) ABSTRACT

An adjusting unit adjusts an output level of digital data converted from image data, based on a correction coefficient for each color. A color correction unit performs a color-correction process of correcting a fluctuation of adjusted output level based on a color-correction parameter that differs from one image reading device to another. The correction coefficient is generated before a reading unit is installed in the image reading device such that the output level becomes a predetermined value when reading the original document without the color-correction process, and then adjusted without the color-correction process at a time of installing the reading unit.

11 Claims, 6 Drawing Sheets

IMAGE READING DEVICE, IMAGE FORMING APPARATUS, AND READING-UNIT INSTALL METHOD

CROSS-REFERENCE TO RELATED APPLICATIONS

The present application claims priority to and incorporates by reference the entire contents of Japanese priority documents, 2007-145467 filed in Japan on May 31, 2007 and 2008-081661 filed in Japan on Mar. 26, 2008.

BACKGROUND OF THE INVENTION

1. Field of the Invention

The present invention relates to an image reading device that reads an original document and generates image data of the original document, an image forming apparatus including the image reading device, and a method of installing a reading unit in the image reading device.

2. Description of the Related Art

FIG. 1 is a schematic diagram of a typical image reading device. The image reading device reads an image of an original document 101 passing between a reference whiteboard 102 and a reading unit 103. An output level of the reading unit 103 depends on various factors such as density of the reference whiteboard 102, distance between the reading unit 103 and the reference whiteboard 102, and variation of spectral characteristics among parts in the reading unit 103.

When the reading unit 103 reads a color original document, red, green, and blue (RGB) values can be uniformly affected by the first factor and the second factor. As a result, an image with the same hue but a different brightness can be obtained. Moreover, even when the reading unit 103 reads the same color image, a different ratio of RGB values can be obtained because of an effect of the third factor. As a result, an image with a different hue and a different brightness can be obtained.

If coefficients for red, green, and blue are set individually so that target RGB values can be obtained when a reference original document is read, the fist factor and the second factor cannot affect the output level. If color correction is performed based on a color-correction parameter that is defined from the RGB values obtained by reading a plurality of color original documents, the third factor cannot affect the output level.

There have been known technologies about the color correction disclosed in, for example, Japanese Patent Application Laid-open No. 2004-104239, Japanese Patent Application Laid-open No. 2000-059637, and Japanese Patent Application Laid-open No. 2000-216997. Japanese Patent Application Laid-open No. 2004-104239 discloses an image reading device that can optimizes a reading level so that a difference between a reading level (output level at which image data is output) using a sheet-through document feeder (SDF) and a reading level using a platen can be small. The image reading device includes a photoelectric converter, a reading optical unit, an analog-signal processing unit, and an analog-to-digital (AD) converter. The photoelectric converter converts image data optically obtained from the original document into an analog electric signal. The optical unit emits a light to the original document and leads the light reflected by the original document to the photoelectric converter. The analog-signal processing unit samples the analog signal generated by the photoelectric converter, and performs a gain adjustment. The AD converter converts the analog signal processed by the analog-signal processing unit into a digital signal. The image reading device has a first reading mode and a second reading mode. In the first reading mode, the reading optical unit reads the original document while the reading optical unit moves under the unmoving original document. In the second reading mode, the reading optical unit reads the original document while the original document moves above the unmoving reading optical unit. The image reading device includes a correction unit that corrects the output level so that the output level of the image data of the original document can be optimized in either the first reading mode or the second reading mode.

Japanese Patent Application Laid-open No. 2000-059637 discloses a method of obtaining constant color reproduction by correcting variation of spectral sensibilities in a scanner due to a light source, a color filter, and the like and reading errors due to the variation of spectral sensibilities. To obtain the constant color reproduction, spectral sensitivity characteristics of the image reading device are assumed based on a measurement value that is obtained by measuring a reference original document with a predetermined measuring unit or a characteristic value of the reference original document and a statistic value calculated by analyzing an image-signal value that is obtained by reading the reference original document with the image reading device. A color-correction parameter is defined based on the spectral sensitivity characteristics. An image signal obtained by the image reading device is corrected using the color-correction parameter.

Japanese Patent Application Laid-open No. 2000-216997 discloses an image reading method in which, if a plurality of types of image signals is obtained under different reading conditions, signal levels of the image signals can be matched with each other by performing correction based on a difference among predetermined reading light intensities not arising errors due to characteristics of the document reading unit but absorbing differences among the image signals (image density data) due to the different reading conditions. In the image reading method, the original document image is photoelectrically read under several types of reading conditions having different light intensities, and thereby several types of image signals are obtained. An image characteristic value is obtained from each of the image signals. The signal levels of the image signals are matched with each other by absorbing the differences among the signal levels using the image characteristic values.

In the typical reading device shown in FIG. 1, the output level can be free from the first to third factors, if required corrections are performed.

However, if, after a color-correction parameter of a color-correction circuit is set, a reading unit including the color-correction circuit is installed in the typical image reading device, a proper color correction cannot be performed. This is because the density of the reference whiteboard and the distance between the reading unit and the reference whiteboard at the installed state can differ from those when the color-correction parameter is set, and thereby an output level at an input side of the color-correction circuit can be changed.

Moreover, the conventional technologies disclosed in Japanese Patent Application Laid-open No. 2004-104239, Japanese Patent Application Laid-open No. 2000-059637, and Japanese Patent Application Laid-open No. 2000-216997 cannot correct the output level at the input side of the color-correction circuit.

SUMMARY OF THE INVENTION

It is an object of the present invention to at least partially solve the problems in the conventional technology.

According to an aspect of the present invention, there is provided an image reading device including a reading unit that reads an original document and outputs image data of the original document; and an image processing unit that processes the image data output from the reading unit. The reading unit includes an optical unit that irradiates the original document with a light, and receives a reflected light from the original document, a converting unit that converts image data obtained from the reflected light into digital data, an adjusting unit that adjusts an output level of the digital data based on a correction coefficient for each color, and a color correction unit that performs a color-correction process of correcting a fluctuation of adjusted output level based on a color-correction parameter that differs from one image reading device to another. The correction coefficient is generated before the reading unit is installed in the image reading device such that the output level becomes a predetermined value when the reading unit reads the original document without the color-correction process, and then adjusted without the color-correction process at a time when the reading unit is installed in the image reading device.

Furthermore, according to another aspect of the present invention, there is provided an image forming apparatus including a reading unit that reads an original document and outputs image data of the original document; and an image processing unit that processes the image data output from the reading unit. The reading unit includes an optical unit that irradiates the original document with a light, and receives a reflected light from the original document, a converting unit that converts image data obtained from the reflected light into digital data, an adjusting unit that adjusts an output level of the digital data based on a correction coefficient for each color, and a color correction unit that performs a color-correction process of correcting a fluctuation of adjusted output level based on a color-correction parameter that differs from one image forming apparatus to another. The correction coefficient is generated before the reading unit is installed in the image forming apparatus such that the output level becomes a predetermined value when the reading unit reads the original document without the color-correction process, and then adjusted without the color-correction process at a time when the reading unit is installed in the image forming apparatus.

Moreover, according to still another aspect of the present invention, there is provided a method of installing a reading unit irradiates an original document with a light and receives a reflected light from the original document, converts image data obtained from the reflected light into digital data, adjusts an output level of the digital data based on a correction coefficient for each color, and performs a color-correction process of correcting a fluctuation of adjusted output level based on a color-correction parameter that differs from one image reading device to another. The method includes first generating including generating the correction coefficient before the reading unit is installed in the image reading device such that the output level becomes a predetermined value when the reading unit reads the original document without the color-correction process; second generating including generating the color-correction parameter for each image reading device; installing the reading unit in the image reading device; and adjusting the correction coefficient without the color-correction process at a time when the reading unit is installed in the image reading device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
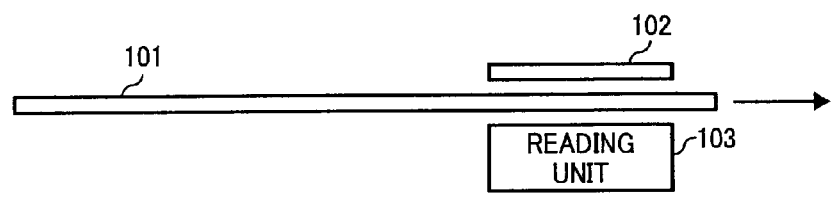
FIG. 1 is a schematic diagram of a typical image reading device.

A conceptual structure of an image reading device 301 according to a first embodiment of the present invention is similar to that of the typical image reading device shown in FIG. 1. That is, the reading unit 103 reads an image of the original document 101 passing between the reference whiteboard 102 and the reading unit 103.

Figure 2:
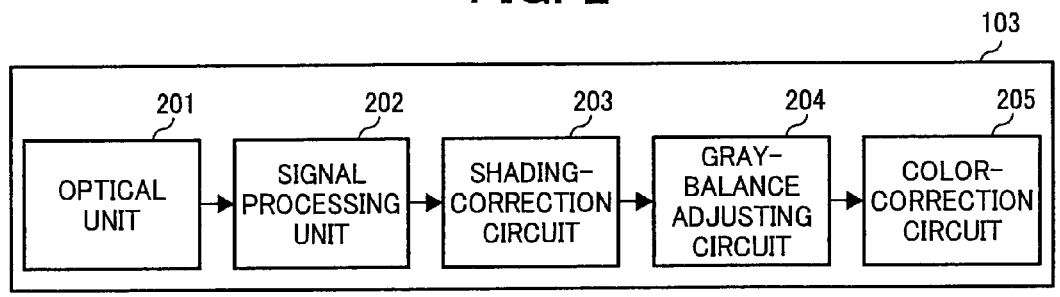
FIG. 2 is a block diagram of a reading unit according a first embodiment of the present invention.

FIG. 2 is a block diagram of the reading unit 103. The reading unit 103 includes an optical unit 201, a signal processing unit 202, a shading-correction circuit 203, a gray-balance adjusting circuit 204, and a color-correction circuit 205.

The optical unit 201 includes a photoelectric conversion element that detects an incident light and converts the incident light into an analog image-signal. The analog image-signal is input to the signal processing unit 202.

Figure 3:
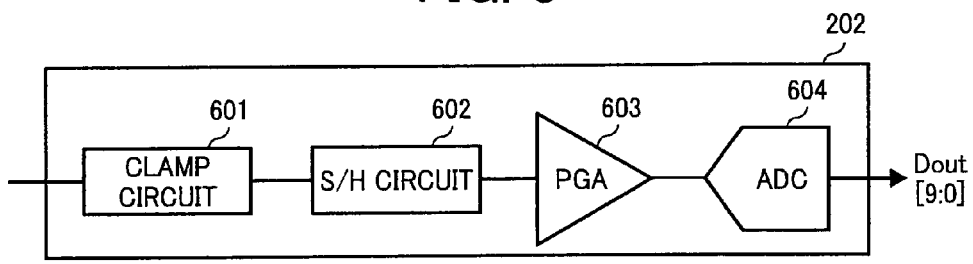
FIG. 3 is a block diagram of a signal processing unit shown in FIG. 2.

FIG. 3 is a block diagram of the signal processing unit 202. The signal processing unit 202 includes a clamp circuit 601, a sample/hold (S/H) circuit 602, a programmable gain amplifier 603, and an analog-to-digital (AD) converter 604. When the signal processing unit 202 receives the analog image-signal, the AC-coupled analog image-signal is clamped to an internal reference potential by the clamp circuit 601. The clamped analog image-signal is sampled with a sampling pulse as a signal-processing unit driving signal, and a level of the sampled analog image-signal is held by the S/H circuit 602. Thereby, the sequential analog image-signal is obtained. The programmable gain amplifier 603 amplifies the sequential analog image-signal by a predetermined gain. The AD converter 604 converts the amplified analog image-signal into digital data.

The digital data is corrected in the shading-correction circuit 203 with regard to unevenness in sensitivity among each pixel of the photoelectron conversion element, unevenness in lens transmittance, and unevenness and depletion due to the lightning system or the optical system. More particularly, white-level reference data for the pixel-based shading correction (hereinafter, "shading data") is obtained by illuminating the reference whiteboard 102 and reading the light reflected by the reference whiteboard 102 before reading of the original document 101. Output data $D_{out}$ is calculated by $$D_{out}=D_{in}/D_{sh}\times(2^n-1) \quad (1)$$

where $D_{in}$ is image data obtained by reading the original document before subjected to the shading correction, $D_{sh}$ is the shading data, n is the number of bits (e.g., n=10).

The gray-balance adjusting circuit 204 adjusts a value of the output data (i.e., output level) using three correction coefficients for red, green, and blue. The three correction coefficients are defined individually so that the output level for reading a reference original document for adjustment (hereinafter, "reference original document") can be a target value. To obtain the shading data, a color correction function of the color-correction circuit 205 is set to OFF to skip the color correction process.

The output data using the correction coefficients can be calculated, for example, by $$D_{out}(R)=D_{in}/D_{sh}\times(2^n-1)\times(2^n+Rref)/2^n \quad (2)$$

$$D_{out}(G)=D_{in}/D_{sh}\times(2^n-1)\times(2^n+Gref)/2^n \quad (3)$$

$$D_{out}(B)=D_{in}/D_{sh}\times(2^n-1)\times(2^n+Bref)/2^n \quad (4)$$

where Rref is a correction coefficient for red, Gref is a correction coefficient for green, and Bref is a correction coefficient for blue.

The gray-balance adjusting circuit 204 calculates following portions in Equations (2) to (4)

$$\times(2^n+Rref)/2^n$$
$$\times(2^n+Gref)/2^n$$
$$\times(2^n+Bref)/2^n$$

The correction coefficients (Rref, Gref, and Bref) are calculated by following Equations (5) to (7) so that the output data of $D_{out}(R)$, $D_{out}(G)$, and $D_{out}(B)$ can be set to target values.

$$Rref=2^n\times\text{target value of }D_{out}(R)/\text{current value of }D_{out}(R)-2^n \quad (5)$$

$$Gref=2^n\times\text{target value of }D_{out}(G)/\text{current value of }D_{out}(G)-2^n \quad (6)$$

$$Bref=2^n\times\text{target value of }D_{out}(B)/\text{current value of }D_{out}(B)-2^n \quad (7)$$

Calculation of correction coefficients using Equations (5) to (7) is performed, for example, before shipment, i.e., before the reading unit 103 is installed in the image reading device 301 in a state that the color-correction function of the color-correction circuit 205 is set to OFF. After that, when the reading unit 103 is installed in the image reading device 301, the correction coefficients are recalculated in a state that the color-correction function of the color-correction circuit 205 is set to OFF. Thus, the correction coefficients before incorporation are adjusted to the new correction coefficients.

The color-correction circuit 205 has a color-correction parameter defined by the individual reading unit 103 to correct an output difference due to spectral characteristics of the optical unit 201.

Figure 4:
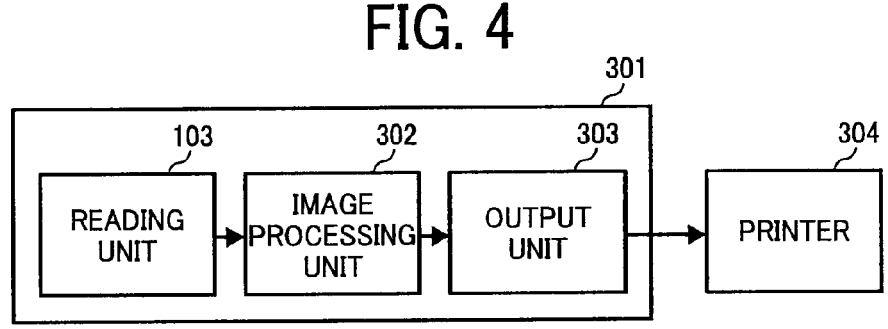
FIG. 4 is a block diagram of an example of an image reading device including the reading unit shown in FIG. 2.

FIG. 4 is a block diagram of an example of the image reading device 301 including the reading unit 103. The image reading device 301 includes the reading unit 103, an image processing unit 302 that processes the image obtained by scanning, and an output unit 303 that performs output image-data sorting or voltage-level conversion. The image data is sent from the image reading device 301 to a printer 304, and is printed by the printer 304 as a printed image. The image reading device 301 and the printer 304 integrally form an image forming apparatus, i.e., copying machine.

Given below is an explanation about an adjusting process under conditions that the reading unit 103 and the image reading device 301 are produced individually at different places, and the color-correction parameter of the color-correction circuit 205 is set at production of the reading unit 103.

The density of the reference whiteboard 102 and the distance between the reading unit 103 and the reference whiteboard 102 when the color-correction parameter is set differ from those after the reading unit 103 is installed in the image reading device 301. Difference in the distance affects the value of the output data (output level) at an input side of the color-correction circuit 205. To correct the output level, after the reading unit 103 is installed in the image reading device 301, the correction coefficients of Rref, Gref, and Bref used in the gray-balance adjusting circuit 204 are update to values recalculated by Equations (5) to (7) so that the output level for reading the reference original document can be the target value in a state that the color-correction function of the color-correction circuit 205 is set to OFF. It is preferable to use the same reference original document for calculating the correction coefficients both before and after the incorporation of the reading unit 103.

Thus, the image reading device in the first embodiment updates the correction coefficients of Rref, Gref, and Bref used in the gray-balance adjusting circuit 204 after the reading unit 103 is installed in the image reading device 301. This makes it possible to obtain proper output data of the gray-balance adjusting circuit 204 that is arranged prior to the color-correction circuit 205, even if the reading unit 103 and the image reading device 301 are produced individually at different places.

Figure 5:
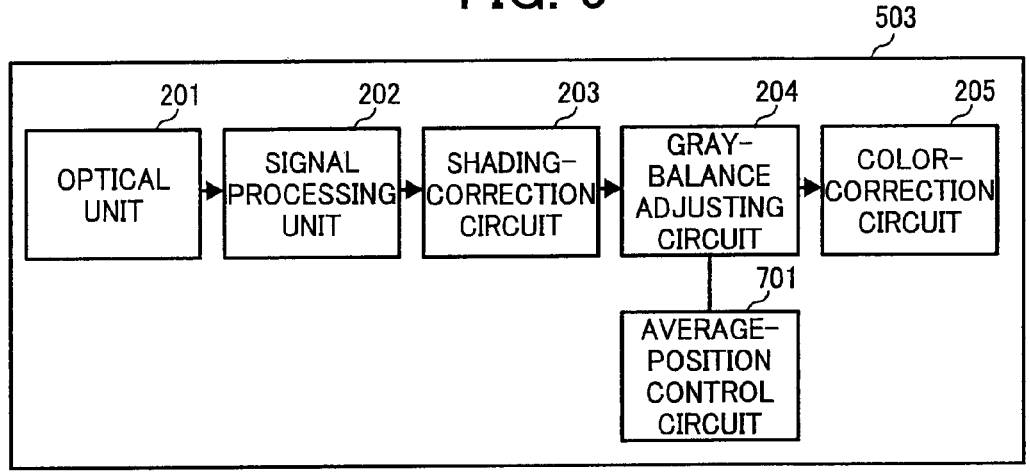
FIG. 5 is a block diagram of a reading unit according to a second embodiment of the present invention.

FIG. 5 is a block diagram of a reading unit 503 according to a second embodiment of the present invention. The reading unit 503 includes an average-position control circuit 701 that calculates an average in a specified positional range of the original document in a main-scanning direction. The average-position control circuit 701 is connected to the gray-balance adjusting circuit 204. Other units in the second embodiment except for the average-position control circuit 701 are similar to those in the first embodiment. The reading unit in the second embodiment can specify a position at which the gray-balance adjusting circuit 204 calculates an average of the reference original document by setting in the average-position control circuit 701 the average in the specified positional range of the original document in the main-scanning direction. Thus, it is possible to calculate the correction coefficients based on the average obtained at the unchanged pixel position in the main-scanning direction.

An image reading device 801 according to a third embodiment of the present invention automatically adjusts the correction coefficients and calculates the average of the reference original document after incorporation of the reading unit 103 to the image reading device 801.

Figure 6:
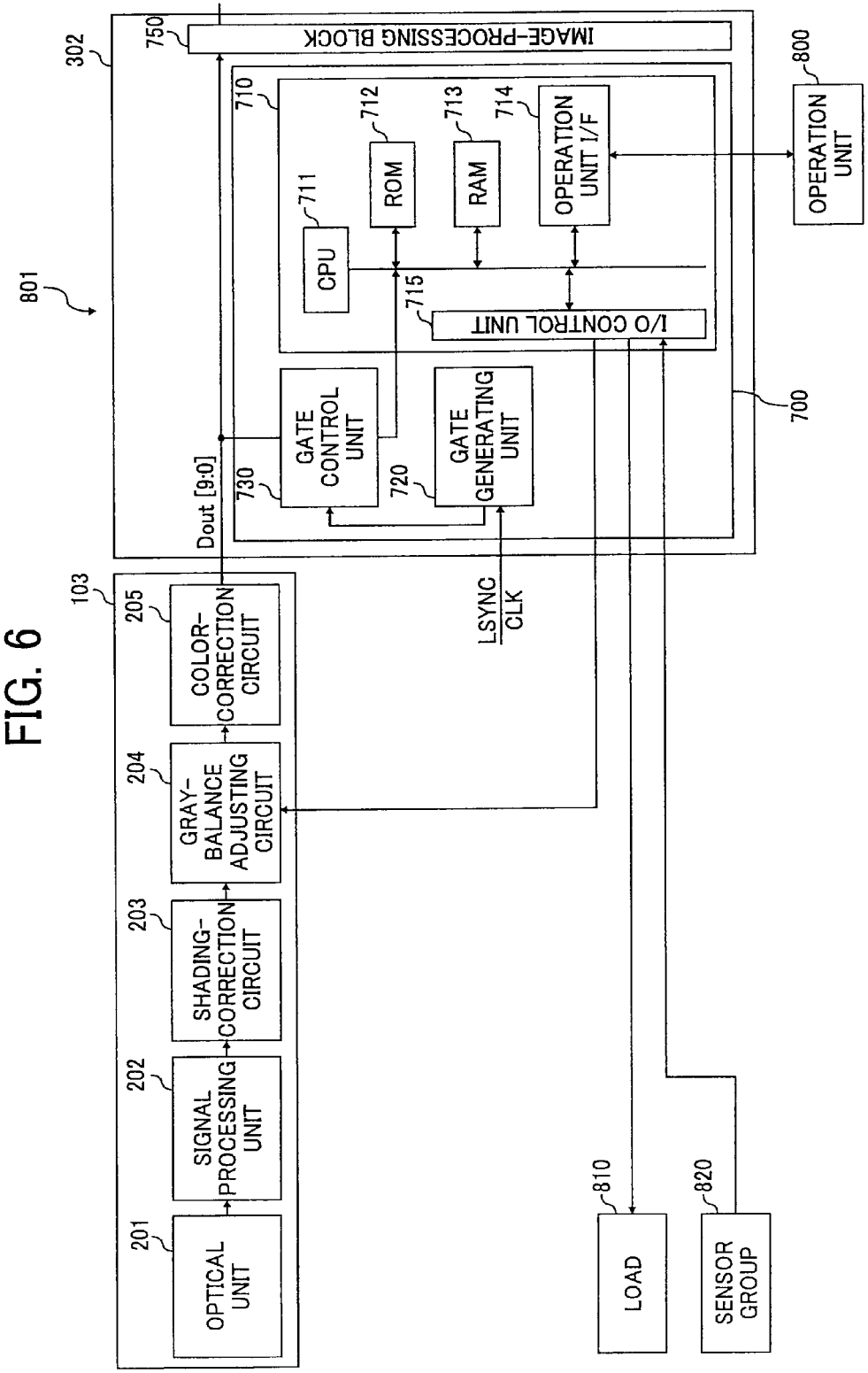
FIG. 6 is a block diagram of an image reading device according to a third embodiment of the present invention.

FIG. 6 is a block diagram of the image reading device 801. The image reading device 801 includes the reading unit 103, the image processing unit 302, a load 810, a sensor group 820, and an operation unit 800. In the third embodiment, the reading unit 103 shown in FIG. 2 is used as the reading unit.

The image processing unit 302 includes a control block 700 that controls the image reading device 801 and an image-processing block 750 that processes the image data obtained by the reading unit 103.

The control block 700 includes a control unit 710, a gate generating unit 720, and a gate control unit 730. The control unit 710 controls the image reading device 801. The gate generating unit 720 generates a gate signal within a range specified by an operator via the operation unit 800. The gate control unit 730 acquires, only during an average gate period based on the gate signal generated by the gate generating unit 720, image data (output data) of $D_{out}$ [9:0] obtained by the reading unit 103.

The control unit 710 includes a central processing unit (CPU) 711, a read only memory (ROM) 712, a random access memory (RAM) 713, an operation-unit interface 714, and an input/output (I/O) control unit 715. The CPU 711 executes various processing programs. The ROM 712 stores therein the computer programs to be executed by the CPU 711. The RAM 713 is used as working area when the CPU 711 executes the computer program. The operation-unit interface 714 acquires data via the operation unit 800, and sends display data to the operation unit 800. The I/O control unit 715 acquires a result of detection from the sensor group 820, and sends based on the acquired result a control command to the load 810 such as a motor in the image reading device 801.

Figure 7:
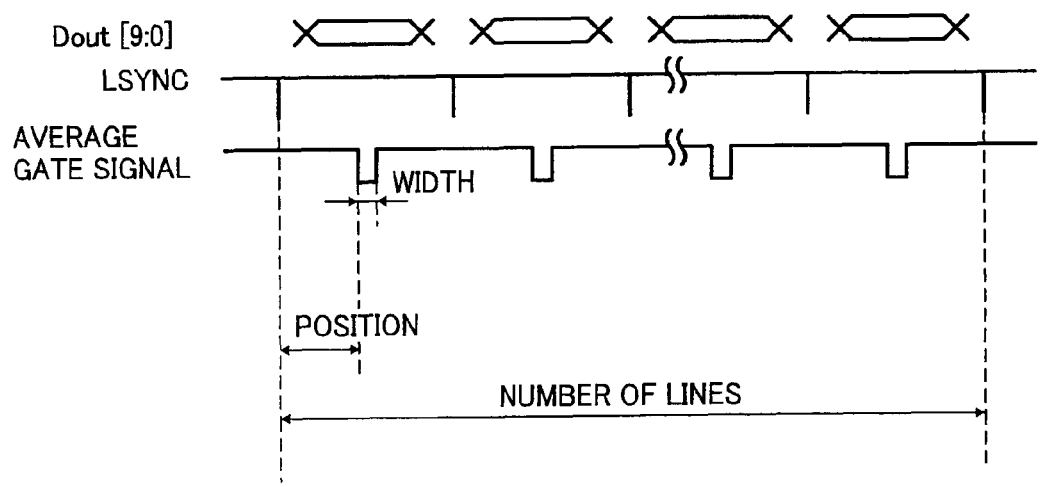
FIG. 7 is a timing chart for explaining a relation between image data, a main-scanning line sync signal of LSYNC, and an average gate.
Figure 8:
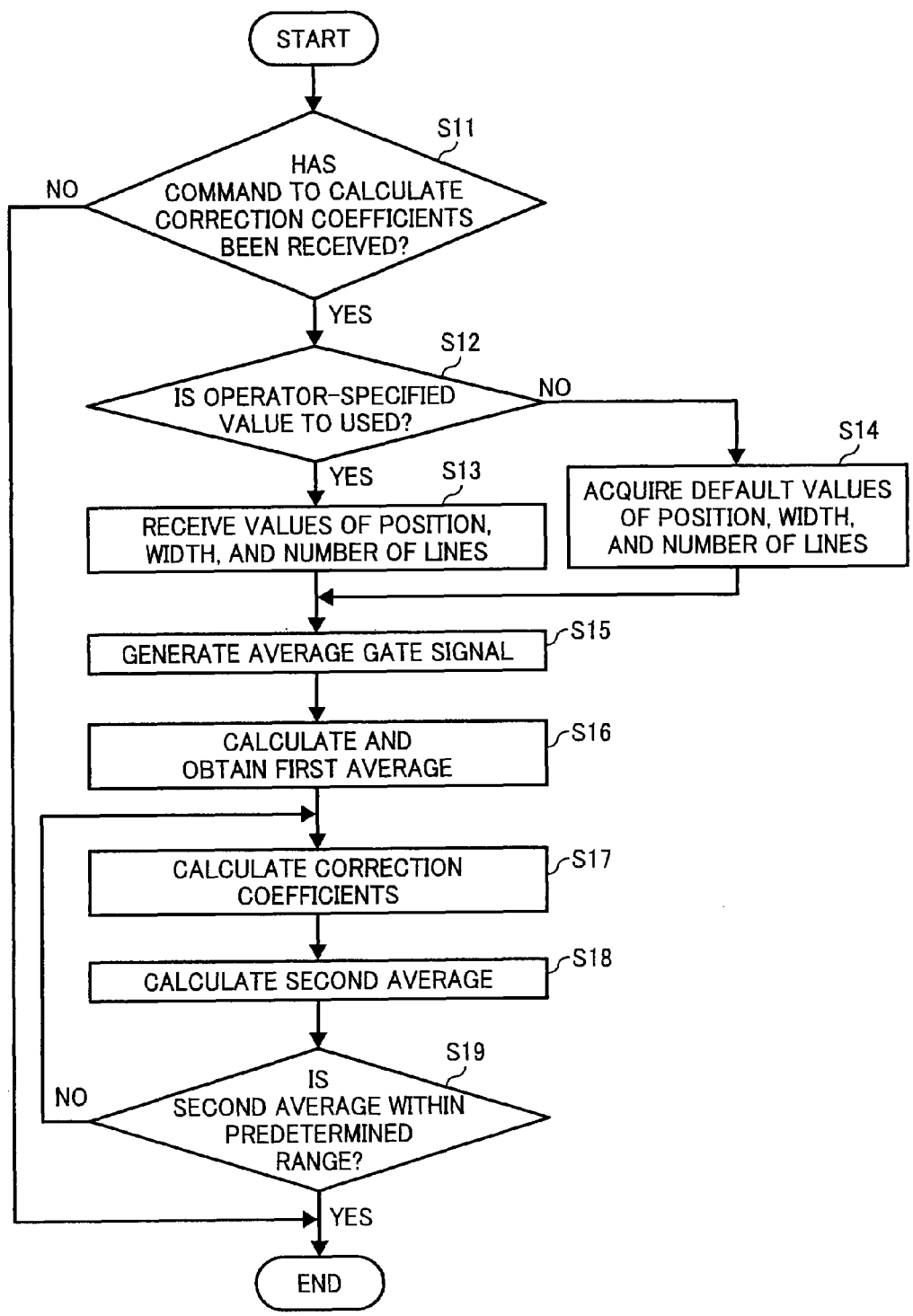
FIG. 8 is a flowchart of a correction-coefficient adjusting process according to the third embodiment.

The gate generating unit 720 generates an average gate signal used for defining a portion to be averaged within the output data of $D_{out}$ [9:0] generated by the reading unit 103. More particularly, a default position is set to a 1000-th pixel, a default width is set to 64 dots, and the default number of lines is set to 16 for example by the I/O control unit 715, and an average gate is generated based on a main-scanning line sync signal (main-scanning LSYNC signal), a clock signal (CLK signal) synchronized with the image data. FIG. 7 is a timing chart for explaining a relation between the image data, the main-scanning LSYNC signal, and the average gate.

The gate control unit 730 performs masking of the image data of $D_{out}$ [9:0] with the average gate signal generated by the gate generating unit 720, and outputs the image data of $D_{out}$ [9:0] only during the average gate signal being low level.

The CPU 711 calculates an average of the output data of $D_{out}$ [9:0] through the gate control unit 730, decides the correction coefficients of Rref, Gref, and Bref by using Equations (5) to (7) so that the calculated average can be a target value, and sends the decided correction coefficients to the gray-balance adjusting circuit 204 via the I/O control unit 715.

Although the gate generating unit 720 generates the average gate signal using the default values of the position, the width, and the number of lines in the above-described case, the gate generating unit 720 can generate the average gate signal using operator-specified values. More particularly, a screen for checking whether the operator wishes to specify operator-specified values is displayed on the operation unit 800. If the operator wishes to specify operator-specified value, the operator inputs certain operator-specified value with the operation unit 800. Thus, the gate generating unit 720 receives the certain operator-specified values via the operation unit 800, and generates the average gate signal using the certain operator-specified values.

Given below is an explanation about a process of adjusting the correction coefficients performed by the control unit 710 of the image reading device 801.

The control unit 710 determines whether a command to calculate the correction coefficients is received from the operator via the operation unit 800 (Step S11). When receiving the command to calculate the correction coefficients (Yes at Step S11), the control unit 710 determines whether a command to use operator-specified values of the position, the width, and the number of lines is received from the operator via the operation unit 800 (Step S12).

When receiving the command to use the operator-specified values (Yes at Step S12), the control unit receives certain operator-specified values of the position, the width, and the number of lines from the operator via the operation unit 800 (Step S13). When the command to use the operator-specified values is not received (No at Step S12), the control unit 710 acquires the default values of the position, the width, and the number of lines from a storage unit, for example, the ROM 712 (Step S14).

After that, the gate generating unit 720 generates the average gate signal using either the certain operator-specified values or the default values (Step S15). The gate control unit 730 performs masking of the output data of $D_{out}$ [9:0] with the generated average gate signal. The control unit 710 receives the output data of $D_{out}$ [9:0] through the gate control unit 730. The CPU 711 of the control unit 710 calculates an average of the received output data of $D_{out}$ [9:0], thereby obtaining a first average (Step S16).

The CPU 711 calculates the three correction coefficients by using the first average and Equations (5) to (7) (Step S17). The CPU 711 sends the calculated correction coefficients to the gray-balance adjusting circuit 204 to update the correction coefficients. After that, the CPU 711 calculates an average of the output data of $D_{out}$ [9:0] in a similar manner at Steps S15 and S16, thereby obtaining a second average (Step S18).

The CPU 711 checks whether the second average is within a target range (Step S19). If the second average is within the target range (Yes at Step S19), the process control goes to end. If the second average is not within the target range (No at Step S19), Steps S17 and S18 are repeated until the second average is within the target range.

Thus, the image reading device 801 according to the third embodiment can automatically adjust the correction coefficients and calculate the average of the reference original document after incorporation of the reading unit 103 to the image reading device 801. This makes it possible to obtain proper values of the output data of the gray-balance adjusting circuit 204 that is arrange prior to the color-correction circuit 205 with a reduced workload of the operator, even if the reading unit 103 and the image reading device 801 are produced individually at different places. Moreover, recalculation of the color-correction parameter is not required even if the reading unit to be installed in the image reading device is produced at a different place, and thereby it is possible to obtain a stable color-correction free from manufacture conditions.

Given below is an explanation about the optical unit 201 used in any one of the first to the third embodiments.

Figure 9:
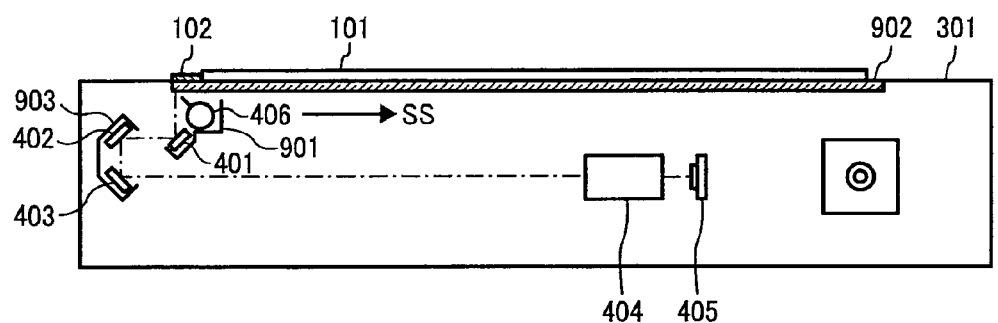
FIG. 9 is a mechanical schematic diagram of an optical unit shown in FIG. 2.

FIG. 9 is a mechanical schematic diagram of the optical unit 201. The optical unit 201 includes a first mirror 401, a second mirror 402, a third mirror 403, an imaging lens 404, a charge-coupled device (CCD) 405 as a photoelectric conversion element, and a light source 406. The first mirror 401 and the light source 406 are mounted on a first carrier 901. The second mirror 402 and the third mirror 403 are mounted on a second carrier 903. The original document 101 placed on an exposure glass 902 is read in a course of the first carrier 901 and the second carrier 903 moving in the sub-scanning direction (SS direction shown in FIG. 9) under the original document 101. A ratio between a moving speed of the first carrier 901 and a moving speed of the second carrier 903 is 2:1.

More particularly, when the illumination system including the light source 406 emits a light to the original document 101, the light is reflected by the original document 101 and is received by the first mirror 401. The light travels to the imaging lens 404 after reflected and deflected by the first mirror 401, the second mirror 402, and the third mirror 403, sequentially. The light passing through the imaging lens 404 is focused onto a surface of the CCD 405. The CCD 405 reads the optical data on the surface, converts the optical data into the analog signal by photoelectric conversion, and sends the analog signal to the signal processing unit 202.

Figure 10:
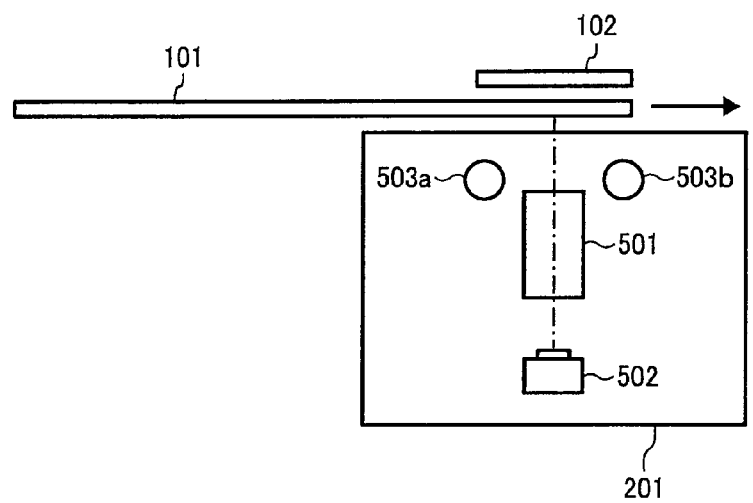
FIG. 10 is a mechanical schematic diagram of another example of the optical unit.

FIG. 10 is a mechanical schematic diagram of another example of the optical unit 201. The optical unit 201 shown in FIG. 10 is formed mainly with a contact image sensor (CIS) 500. The CIS 500 includes a Selfoc (registered trademark) lens array (SLA) 501, a sensor integrated circuit (IC) 502, and light sources 503a and 503b. The illumination system including the light sources 503a and 503b emits a light to the original document 101. The light reflected by the original document 101 passes through the SLA 501, and focuses on a surface of the sensor IC 502.

In the examples of the optical unit shown in FIGS. 9 and 10, the original document 101 and the optical unit 201 moves relatively to each other in the sub-scanning direction. That is, either the optical unit 201 or the original document 101 can move in the sub-scanning direction.

As described above, according to an aspect of the present invention, when a reading unit is installed in an image reading device, a correction coefficient is adjusted. This makes it possible to perform a proper color correction even if an output level of the reading unit can vary depending on the image reading device in which the reading unit is installed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a reading unit that reads an original document and outputs image data of the original document; and
an image processing unit that processes the image data output from the reading unit, wherein
the reading unit includes
an optical unit that irradiates the original document with a light, and receives a reflected light from the original document,
a converting unit that converts image data obtained from the reflected light into digital data,
an adjusting unit that adjusts an output level of the digital data based on a correction coefficient for each color, and
a color correction unit that performs a color-correction process of correcting a fluctuation of adjusted output level based on a color-correction parameter that differs from one image reading device to another, and
the correction coefficient is generated before the reading unit is installed in the image reading device such that the output level becomes a predetermined value when the reading unit reads the original document without the color-correction process, and then adjusted without the color-correction process at a time when the reading unit is installed in the image reading device.

2. The image reading device according to claim 1, further comprising a control unit that adjusts the correction coefficient without the color-correction process at the time when the reading unit is installed in the image reading device.

3. The image reading device according to claim 2, further comprising a receiving unit that receives information about a positional range of the original document in a main-scanning direction, wherein
the control unit calculates an average value of the digital data in the positional range received by the receiving unit, and adjusts the correction coefficient based on the average value.

4. The image reading device according to claim 1, wherein the correction coefficient is generated, before and after the reading unit is installed in the image reading device, based on output levels obtained by reading same portion in a main-scanning direction of the original document.

5. The image reading device according to claim 1, wherein the correction coefficient is adjusted without the color-correction process after the reading unit is installed in the image reading device such that the output level becomes the predetermined value when the reading unit reads same original document as the one used for generating the correction coefficient before the reading unit is installed in the image reading device.

6. The image reading device according to claim 1, wherein the optical unit includes a focusing optical module.

7. The image reading device according to claim 1, wherein the optical unit includes a contact image sensor.

8. An image forming apparatus comprising:
a reading unit that reads an original document and outputs image data of the original document; and
an image processing unit that processes the image data output from the reading unit, wherein
the reading unit includes
an optical unit that irradiates the original document with a light, and receives a reflected light from the original document,
a converting unit that converts image data obtained from the reflected light into digital data,
an adjusting unit that adjusts an output level of the digital data based on a correction coefficient for each color, and
a color correction unit that performs a color-correction process of correcting a fluctuation of adjusted output level based on a color-correction parameter that differs from one image forming apparatus to another, and
the correction coefficient is generated before the reading unit is installed in the image forming apparatus such that the output level becomes a predetermined value when the reading unit reads the original document without the color-correction process, and then adjusted without the color-correction process at a time when the reading unit is installed in the image forming apparatus.

9. A method of installing a reading unit irradiates an original document with a light and receives a reflected light from the original document, converts image data obtained from the reflected light into digital data, adjusts an output level of the digital data based on a correction coefficient for each color, and performs a color-correction process of correcting a fluctuation of adjusted output level based on a color-correction parameter that differs from one image reading device to another, the method performed using an image reading device, comprising:
first generating including generating the correction coefficient before the reading unit is installed in the image reading device such that the output level becomes a predetermined value when the reading unit reads the original document without the color-correction process;

second generating including generating the color-correction parameter for each image reading device;

installing the reading unit in the image reading device; and adjusting the correction coefficient without the color-correction process at a time when the reading unit is installed in the image reading device.

10. The method according to claim 9, wherein the adjusting includes adjusting the correction coefficient based on the output level obtained by reading same portion in a main-scanning direction of the original document as the one used for generating the correction coefficient at the first generating.

11. The method according to claim 9, wherein the adjusting includes adjusting the correction coefficient such that the output level becomes the predetermined value when reading same original document as the one used at the first generating.

* * * * *